US008705809B2

(12) United States Patent
Kong et al.

(10) Patent No.: US 8,705,809 B2
(45) Date of Patent: Apr. 22, 2014

(54) METHOD AND APPARATUS FOR IMAGE GENERATION

(75) Inventors: Wai Kin Adams Kong, Singapore (SG); Naif Alajlan, Riyadh (SA)

(73) Assignee: King Saud University (SA)

( * ) Notice: Subject to any disclaimer, the term of this patent is extended or adjusted under 35 U.S.C. 154(b) by 659 days.

(21) Appl. No.: 12/894,990

(22) Filed: Sep. 30, 2010

(65) Prior Publication Data

US 2012/0082349 A1 Apr. 5, 2012

(51) Int. Cl.
G06K 9/00 (2006.01)

(52) U.S. Cl.
USPC .......................................................... 382/117

(58) Field of Classification Search
None
See application file for complete search history.

(56) References Cited

U.S. PATENT DOCUMENTS

| | | | | |
|---|---|---|---|---|
| 6,917,703 | B1* | 7/2005 | Steffens et al. | 382/156 |
| 7,616,787 | B2* | 11/2009 | Boshra | 382/124 |
| 7,676,068 | B2* | 3/2010 | Cervantes | 382/115 |
| 7,801,893 | B2* | 9/2010 | Gulli' et al. | 707/737 |
| 2003/0123711 | A1* | 7/2003 | Kim et al. | 382/117 |
| 2005/0013490 | A1* | 1/2005 | Rinne et al. | 382/226 |
| 2007/0078846 | A1* | 4/2007 | Gulli et al. | 707/5 |
| 2009/0279790 | A1* | 11/2009 | Burge et al. | 382/209 |
| 2010/0223237 | A1* | 9/2010 | Mishra et al. | 707/693 |
| 2010/0306158 | A1* | 12/2010 | Andersen et al. | 706/52 |
| 2011/0219044 | A1* | 9/2011 | Peukert | 707/805 |
| 2012/0082349 | A1* | 4/2012 | Kong et al. | 382/117 |
| 2012/0274756 | A1* | 11/2012 | Bergen et al. | 348/78 |

OTHER PUBLICATIONS

Kong, A.W.-K, "IrisCode Decompression Based on the Dependence between Its Bit Pairs" IEEE Transactions on Pattern Analysis and Machine Intelligence, Mar. 2012, Forensics & Security Lab., Nanyang Technol. Univ., Singapore, Singapore, vol. 34 , Issue: 3 pp. 506-520.*

J.G. Daugman, "High confidence visual recognition of persons by a test of statistical independence", IEEE Transactions on Pattern Analysis and Machine Intelligence, vol. 15, No. 11, pp. 1148-1161, 1993.

D. Zhang, W.K. Kong, J. You and M. Wong, "On-line palmprint identification", IEEE Transactions on Pattern Analysis and Machine Intelligence, vol. 25, No. 9, pp. 1041-1050, 2003.

L. Ma, T. Tan, Y. Wang, D. Zhang, "Efficient iris recognition by characterizing key local variations", IEEE Transactions on Image Processing, vol. 13, No. 6, pp. 739-750, 2004.

Z. Sun, T. Tan and Y. Wang, "Iris recognition based on non-local comparisons", Lecture Notes in Computer Science, Springer, vol. 3338, pp. 491-497, 2004.

E. Krichen, M.A. Mellakh, S. Garcia-Salicetti, B. Dorizzi, "Iris identification using wavelet packets", in Proceedings of International Conference on Pattern Recognition, vol. 4, pp. 226-338, 2004.

(Continued)

*Primary Examiner* — Tahmina Ansari
(74) *Attorney, Agent, or Firm* — Lerner, David, Littenberg, Krumholz & Mentlik, LLP

(57) ABSTRACT

Method and apparatus for image generation from biometric data is disclosed herein. In a described embodiment, the biometric data is in the form of IrisCode and the method comprises constructing a graph of filter responses and bits which define the biometric data; comparing the bits with corresponding bits of reference graphs of a trained database to obtain an optimal graph; updating the filter responses based on the optimal graph; and decompressing the IrisCode based on the updated filter responses to generate an image. The image may be a reconstruction of an original image which is defined by the IrisCode.

23 Claims, 10 Drawing Sheets

(56) References Cited

OTHER PUBLICATIONS

S.I. Noh, K. Bae, Y. Park and J. Kim, "A novel method to extract features for iris recognition system", Lecture Notes in Computer Science, Springer, vol. 2688, pp. 861-868, 2003.

K. Bea, S. Noh and J. Kim, "Iris feature extraction using independent component analysis", Lecture Notes in Computer Science, Springer, vol. 2688, pp. 838-844, 2003.

P.F. Zhang, D.S. Li and Q. Wang, "A novel iris recognition method based on feature fusion", in Proceedings of the Third International Conference on Machine Learning and Cybernetics, pp. 26-29, 2004.

T. Ea, A. Valentian, F. Rossant, F. Amiel and A. Amara, "Algorithm implementation for iris identification", in Proceeding of 48th Midwest Symposium on Circuits and Systems, pp. 1207-1210, 2005.

C. H. Park, J.J. Lee, S. K. Oh, Y.C. Song, D.H. Choi and K.H. Park, "Iris feature extraction and matching based on multiscale and directional image representation", LNCS, Springer, vol. 2695, pp. 576-583, 2004.

E. Rydgren, T.E.A.F. Amiel, F. Rossant and A. Amara, "Iris features extraction using wavelet packets", in Proceedings of International Conference on Image Processing, vol. 2, pp. 861-864, 2004.

L. Masek, Recognition of Human Iris Patterns for Biometric Identification, Bachelor thesis, The University of Western Australia.

J. Daugman, "The importance of being random: statistical principles of iris recognition", Pattern Recognition, vol. 36, pp. 279-291, 2003.

R. Cappelli, D. Maio, A. Lumini, D. Maltoni, "Fingerprint Image Reconstruction from Standard Templates", IEEE TPAMI, vol. 29, No. 9, pp. 1489-1503, 2007.

A. Ross, J. Shah and A.K. Jain, "From Template to Image: Reconstructing Fingerprints from Minutiae Points", IEEE TPAMI, vol. 29, No. 4, pp. 544-560, 2007.

J.G. Daugman, "Complete discrete 2-D Gabor transforms by neural networks for image analysis and compression", IEEE Transactions on Acoustics, Speech and Signal Processing, vol. 36, No. 7, pp. 1169-1179, 1988.

T.S. Lee, "Image representation using 2D Gabor wavelets", IEEE Transactions on Pattern Analysis and Machine Intelligence, vol. 18, No. 10, pp. 959-971, 1996.

J. Behar, M. Porat and Y.Y. Zeevi, "Image reconstruction from localized phase", IEEE Transactions on Signal Processing, vol. 40, No. 4, pp. 736-743, 1992.

A.W.K Kong, D. Zhang and M. Kamel, "An analysis of IrisCode", IEEE Transactions on Image Processing, vol. 19. No. 2, pp. 522-532, 2010.

Z. Sun and T. Tan, "Ordinal measures for iris recognition", IEEE Transactions on Pattern Analysis and Machine Intelligence, vol. 31, No. 12, pp. 2211-2226, 2009.

Z. Sun, T. Tan, Y. Wang and S.Z. Li, "Ordinal palmprint representation for personal identification", in Proceedings of IEEE Computer Society Conference on Computer Vision and Pattern Recognition, vol. 1, pp. 279-284, 2005.

A.W.K. Kong and D. Zhang, "Competitive coding scheme for palmprint verification", in Proceedings of International Conference on Pattern Recognition, vol. 1, pp. 520-523, 2004.

Lin Zhang <http://www4.comp.polyu.edu.hk/%7Ecslinzhang/>, Lei Zhang, and David Zhang, "Finger-knuckle-print: a new biometric identifier <http://www4.comp.polyu.edu.hk/%7Ebiometrics/FINGER-KNUCKLE-PRINT%20A%20NEW%20BIOMETRIC%20IDENTIFIER.pdf>", Proceedings of the IEEE International Conference on Image Processing, 2009.

Adams Kong, "An analysis of Gabor detection", International Conference on Image Analysis and Recognition, (ICIAR), Halifax, Canada, Jul. 6-8, 2009).

A.T.B. Jin, D.N.C. Ling and A. Goh, "Biohashing: two factor authentication featuring fingerprint data and tokenized random number", Pattern Recognition, vol. 37, pp. 2245-2255, 2004.

A. Kong, K.H Cheung, D. Zhang, M. Kamel and J. You, "An analysis of Biohashing and its variants", Pattern Recognition, vol. 39, No. 7, pp. 1359-1368, 2006.

\* cited by examiner

METHOD AND APPARATUS FOR IMAGE GENERATION

FIELD OF THE INVENTION

The present invention relates to a method and apparatus for image generation.

BACKGROUND OF THE INVENTION

There are many types of biometric algorithms presently known in the art. IrisCode is an example of such a biometric algorithm. IrisCode has had great success in biometric markets as a result of its strengths, including high matching speed, predictable false acceptance rate, and robustness against local brightness and contrast variations. A method of generating IrisCode and using the IrisCode features are disclosed in J. G. Daugman, "*High confidence visual recognition of persons by a test of statistical independence*", *IEEE Transactions on Pattern Analysis and Machine Intelligence*, vol. 15, no. 11, pp. 1148-1161, 1993, the contents of which are incorporated herein by reference.

The obtaining of an IrisCode from an original image uses the "lesser than" i.e. "<" and the "greater or equation than" i.e. "≥" operators, thus retaining only the signs of the filter responses as features of biometric templates. This involves applying two-dimensional Gabor filters with zero DC globally to the whole of an original image in a dimensionless polar coordinate system denoted $I_0(\rho, \phi)$, where $\rho$ denotes the radial coordinate and $\phi$ the angular coordinate. The complex Gabor response is encoded into two bits ($h_{Re}$ and $h_{Im}$) by using the following inequalities:

$$h_{Re} = \quad (1)$$
$$1 \text{ if } \text{Re}\left(\int_\rho \int_\phi I_0(\rho, \phi) e^{-(r_0-\rho)^2/\alpha^2} e^{-(\theta_0-\phi)^2/\beta^2} e^{-i\omega(\theta_0-\phi)} \rho \, d\rho \, d\phi\right) \geq 0$$

$$h_{Re} = \quad (2)$$
$$0 \text{ if } \text{Re}\left(\int_\rho \int_\phi I_0(\rho, \phi) e^{-(r_0-\rho)^2/\alpha^2} e^{-(\theta_0-\phi)^2/\beta^2} e^{-i\omega(\theta_0-\phi)} \rho \, d\rho \, d\phi\right) < 0$$

$$h_{Im} = \quad (3)$$
$$1 \text{ if } \text{Im}\left(\int_\rho \int_\phi I_0(\rho, \phi) e^{-(r_0-\rho)^2/\alpha^2} e^{-(\theta_0-\phi)^2/\beta^2} e^{-i\omega(\theta_0-\phi)} \rho \, d\rho \, d\phi\right) \geq 0$$

$$h_{Im} = \quad (4)$$
$$0 \text{ if } \text{Im}\left(\int_\rho \int_\phi I_0(\rho, \phi) e^{-(r_0-\rho)^2/\alpha^2} e^{-(\theta_0-\phi)^2/\beta^2} e^{-i\omega(\theta_0-\phi)} \rho \, d\rho \, d\phi\right) < 0$$

where $r_0$, $\theta_0$, $\omega$, $\alpha$ and $\beta$ are the parameters of the Gabor filters. $r_0$ and $\theta_0$ respectively denotes the location of the filter, $\omega$ denotes the Gabor wavelet frequency, and $\alpha$ and $\beta$ are parameters controlling the wavelet size. Re(A) denotes the real component of A while Im(A) denotes the imaginary component of A.

Many methods developed for biometrics use the computational core of IrisCode. These methods typically replace the usage of Gabor filters as is done in Equations 1-4 with other forms of linear filters or functions. Examples of such biometrics are PalmCode for palm print recognition which is disclosed in D. Zhang, W. K. Kong, J. You and M. Wong, "*Online palmprint identification*", *IEEE Transactions on Pattern Analysis and Machine Intelligence*, vol. 25, no. 9, pp. 1041-1050, 2003, or Ordinal Code for iris recognition which is disclosed in Z Sun and T. Tan, "*Ordinal measures for iris recognition*", *IEEE Transactions on Pattern Analysis and Machine Intelligence*, vol. 31, no. 12, pp. 2211-2226, 2009.

These biometric methods essentially are feature extraction algorithms. The filtering and binarization processes may cause too much information inherent in the original biometric images to be lost, thus making the obtaining of biometric images from the biometric features generally unfeasible. As a result, original or compressed versions of the original images have to be stored so as to provide an image for reference and/or upgrading biometric systems. An example of this is in the case of IrisCode where the original iris images may be stored to allow for upgrading iris recognition systems.

It is an object of the present invention to provide a method of generating images from biometric features and devices which address at least one of the problems of the prior art and/or to provide the public with a useful choice.

SUMMARY OF THE INVENTION

In general terms, a first aspect of the invention relates to a method of image generation from biometric features. This may have the advantage of providing a method of decompressing images from biometric features and consequently may enable the biometric features to provide a feasible compressed image compression.

According to a first specific expression of the invention, there is provided a method of generating an image from biometric data, the method comprising constructing a graph of filter responses and bits which define the biometric data; comparing the bits with corresponding bits of reference graphs of a biometric database to obtain an optimal graph; updating the filter responses based on the optimal graph; and decompressing the biometric data based on the updated filter responses to generate an image.

Constructing the graph may comprise calculating a plurality of real components and a plurality of imaginary components from the biometric data based on the graph. The method may further comprise adding the calculated plurality of real and imaginary components to produce the generated image. The graph may comprise a plurality of nodes and a plurality of edges, wherein each of the plurality of nodes comprises a response value for modelling respective ones of the filter responses, and each of the plurality of edges comprises a magnitude of an inner product of two filters associated with the ends of each edge.

Each node may include a counter, and the method may further comprise updating the graph which includes:
setting each response value and counter to zero;
searching the biometric database based on the bits to determine the optimal graph; and
updating the response values and the counters based on the optimal graph.

Preferably, the references graphs are trained with a respective plurality of training images, each of the plurality of trained graphs comprising a plurality of trained nodes and a plurality of trained edges, wherein each of the plurality of trained nodes comprises a bit pair and a training response value modelling a training filter response of the training image, and each of the plurality of trained edges comprises a training magnitude of an inner product of two training filters associated with ends of each trained edge.

Each of the plurality of trained edges may be sorted. Preferably, obtaining the optimal graph includes searching the biometric database which may comprise scoring the biometric data with bit pairs of each of the plurality of reference graphs using a scoring function to produce a respective plurality of scores, and selecting the optimal graph by applying a searching criterion on the plurality of scores.

Each of the plurality of edges of the graph may be sorted. Preferably, the scoring function is:

$$f(B_{kR(j,t)}, B_{qR(j,t)}) = \begin{cases} 1 & \text{if } b_{kR(j,t)r} = b_{qR(j,t)r} \text{ and } b_{kR(j,t)i} = b_{qR(j,t)i} \\ -\infty & \text{otherwise} \end{cases}$$

where $f(B_{kR(j,t)}, B_{qR(j,t)})$ denotes the scoring function taking as input parameters $B_{kR(j,t)}$ and $B_{qR(j,t)}$;

where $B_{kR(j,t)}$ denotes the bit pair from a R(j,t)-th node of a k-th trained graph of the database, $B_{kR(j,t)}$ comprised of real and imaginary bits respectively denoted $b_{kR(j,t)r}$ and $b_{kR(j,t)i}$;

where $B_{qR(j,t)}$ denotes a R(j,t)-th bit pair from the IrisCode that is denoted q, $B_{qR(j,t)}$ comprised of real and imaginary bits respectively denoted $b_{qR(j,t)r}$ and $b_{qR(j,t)i}$; and where R(j,t) is an indexing function for sorting a plurality of edges between a plurality of j-th nodes and a plurality of t-th nodes, the indexing function used for sorting the plurality of trained edges and the plurality of edges of the generating graph.

Preferably, the searching criterion is defined as:

$$(k_j, T_j) = \mathrm{argmax}_k \left( \max_T \left( \sum_{i=1}^{T} f(B_{kR(j,t)}, B_{qR(j,t)}) \right) \right)$$

where $k_j$ is an index number of a graph of the plurality of optimal graph;

$T_j$ is the number of nodes of the $k_j$-th optimal graph with bit pairs matching the $B_{qR(j,t)}$ for the plurality of j-th nodes; and T is a variable between 1 and 1024.

Updating the response values and the counters may comprise:

$$S_{qR(j,t)} = S_{qR(j,t)} + \Psi(j,t) \times S_{k_jR(j,t)}$$

$$C_{qR(j,t)} = C_{qR(j,t)} + \Psi(j,t)$$

where $S_{qR(j,t)}$ is the response value of the R(j,t)-th node from the biometric data denoted q, $S_{k_jR(j,t)}$ is the response value of the R(j,t)-th node of the $k_j$-th optimal graph, $C_{qR(j,t)}$ is the counter of the R(j,t)-th node from the IrisCode denoted q, and $\Psi(j,t)$ is the weight of the edge between a j-th node and a t-th node of the $k_j$-th optimal graph.

Calculating the plurality of real and imaginary components may further comprise normalizing the updated response values of the plurality of nodes with the updated counter values of the plurality of nodes;

decomposing the normalized updated response values into the plurality of real components and the plurality of imaginary components; and rescaling the plurality of real and imaginary components by a scaling value.

Preferably, normalizing the updated response values of the plurality of nodes comprises dividing the updated response values by the updated counter values.

The scaling value may be:

$$\alpha/X_q$$

where $\alpha$ is a scale factor; and $X_q$ is a contrast value of the plurality of real and imaginary components.

$\alpha$ may be defined as:

$$\alpha = \frac{1}{K} \sum_{k=1}^{K} X_k$$

where $X_k$ is a contrast value of a k-th image of the plurality of training images; and K is the number of images in the plurality of training images.

$X_q$ may be defined as:

$$X_q = \left\| \sum_{j=1}^{n} \langle g_{rj}, \hat{I}_q \rangle \xi_{rj} + \sum_{j=1}^{n} \langle g_{ij}, \hat{I}_q \rangle \xi_{ij} \right\|$$

where $\hat{I}_q$ is an approximate of the generated image;

$g_{rj}$ and $g_{ij}$ respectively are a j-th real filter and a j-th imaginary filter;

$\langle g_{rj}, \hat{I}_q \rangle$ is an inner product between $g_{rj}$ and $\hat{I}_q$;

$\langle g_{ij}, \hat{I}_q \rangle$ is an inner product between $g_{ij}$ and $\hat{I}_q$;

$\xi_{rj}$ and $\xi_{ij}$ respectively are vectors associating with the inner products $\langle g_{rj}, \hat{I}_q \rangle$ and $\langle g_{ij}, \hat{I}_q \rangle$; and n is the number of the plurality of nodes.

The training filter response of each of the plurality of trained nodes may be a Gabor filter response. Also, the filter response of each of the plurality of nodes may be a Gabor filter response.

The biometric data may be a feature for iris recognition. The feature for iris recognition may be IrisCode. The generated image may be a reconstruction of an original image, the biometric data being derived from the original image.

Generating the image may further comprise removing artifacts from the generated image. The described embodiment proposes two ways namely: interference artifact removal and compression artifact removal.

Indeed, these ways may form independent aspects of the invention, and according to a second specific expression, there is provided a method for interference artifact removal from an image comprising:

computing a frequency band information from a spectrum of the image; and optimizing an objective function comprising the frequency band information to produce a resultant image.

Computing the frequency band information may comprise performing a two-dimensional Fourier transform on the image to produce a plurality of real image component and a plurality of imaginary image component.

The objective function may comprise a weighting function and a logarithm of the frequency band information, wherein the weighting function may emphasize on minimizing energy in high frequency bands.

Optimizing the objective function may comprise finding a local optimal of the objective function. In this respect, optimizing the objective function may iteratively update the plurality of real and imaginary image components.

Optimizing the objective function may further comprise checking the signs of the plurality of real and imaginary image components between iterations.

Preferably, optimizing the objective function may use gradient descent.

Computing the frequency band information may further comprise arranging the plurality of real and imaginary image components in a vector of the form $$\hat{M}=[<g_{r1},\hat{I}>,\ldots,<g_{rn},\hat{I}>,<g_{i1},\hat{I}>,\ldots,<g_{in},\hat{I}>]^T$$

where $\hat{M}$ denotes the vector;
$<g_{r1},\hat{I}>, \ldots, <g_{rn},\hat{I}>$ are the plurality of real image components;
$<g_{i1},\hat{I}>, \ldots, <g_{in},\hat{I}>$ are the plurality of imaginary image components;
$\hat{I}$ is the image;
$g_{r1} \ldots g_{rn}$ are n real filters; and
$g_{i1} \ldots g_{in}$ are n imaginary filters.

According to a third specific expression, there is provided a method for compression artifacts removal from an image comprising:

approximating a resultant image using a plurality of training images;

minimizing energy in a plurality of selected frequency bands of the approximated resultant image; and optimizing an objective function comprising the energy minimized approximated resultant image to produce a final resultant image.

Approximating the resultant image may comprise:

producing a plurality of residual components from the respective plurality of training images by subtracting from each of the plurality of training images a real component, an imaginary component and a brightness component;

producing a plurality of sub-space components by performing sub-space analysis on the plurality of residual components; and adding together a mean of the residual components and the plurality of sub-space components.

The plurality of sub-space components may be weighted by a respective plurality of coefficients. Minimizing the energy in the plurality of selected frequency bands may comprise:

associating the plurality of coefficients with the plurality of selected frequency bands; and modifying the plurality of coefficients.

The sub-space analysis performed on the plurality of residual components may be principal component analysis and the plurality of sub-space components may be a plurality of eigenvectors. Optimizing the objective function may comprise finding a near global optimal of the objective function.

In a fourth specific expression, there is provided apparatus for generating an image from biometric data, the apparatus comprising a processor configured to:

construct a graph of filter responses and bits which define the biometric data;

compare the bits with corresponding bits of reference graphs of a biometric database to obtain an optimal graph;

update the filter responses based on the optimal graph; and decompress the biometric data based on the updated filter responses to generate an image.

In a fifth specific expression, there is provided a method for image generation from IrisCode comprising: providing an IrisCode obtained from an original image, and generating an image from the IrisCode, the generated image being a reconstruction of the original image.

In a sixth specific expression, there is provided an apparatus configured for image generation from IrisCode, the IrisCode obtained from an original image, the apparatus comprising a processor configured to generate an image from the IrisCode, the generated image a reconstruction of the original image.

The described embodiment may have an advantage of allowing the generated images to be used for testing and challenging the privacy and security of various biometric systems e.g. iris recognition systems. This is because the described embodiments may be capable of generating images of a reasonable quality.

In addition, the ability to reconstruct iris images from predefined IrisCode may be highly advantageous for algorithmic evaluation and security analysis of iris recognition systems.

The described embodiment may also have an advantage of allowing the visualization of images from biometric features. As an example, while IrisCode stores information about iris images, there previously may have been no way to visualize this information.

Further, the possibility of visualizing images from biometrics may have the added advantage that original biometric images no longer have to be stored for reference, visualization, and/or system upgrade purposes. The described embodiments may also utilize prior knowledge from a trained biometric database and thus may allow the generation of images from highly compressed or lossy features.

BRIEF DESCRIPTION OF THE DRAWINGS

In order that the invention may be fully understood and readily put into practical effect there shall now be described by way of non-limitative example only, an example embodiment described below with reference to the accompanying illustrative drawings in which:

FIGS. 12(*c*) and (*d*) are two photographs of images generated using the method of FIG. 4 from IrisCodes respectively obtained from FIGS. 12(*a*) and (*b*);

FIGS. 12(*e*) and (*f*) are two photographs of resultant images from FIGS. 12(*c*) and (*d*) respectively after applying the method of interference artifacts removal of FIG. 9;

FIG. 13(*b*) is a photograph of a log power spectrum image of FIG. 13(*a*);

FIGS. 13(*c*), (*e*) and (*g*) are three photographs of the top three principle components estimated from the plurality of K training images in the method of FIG. 10;

FIGS. 13(*d*), (*f*) and (*h*) are three photographs of log power spectrum images respectively of FIGS. 13(*c*), (*e*) and (*g*);

FIGS. 14(*c*) and (*d*) are two photographs of images after applying the method of interference artifacts removal of FIG. 9 on respective images generated from IrisCodes obtained from FIGS. 14(*a*) and (*b*);

FIGS. 14(*e*) and (*f*) are two photographs of images after applying the method of compression artifacts removal of FIG. 10 on FIGS. 14(*c*) and (*d*) respectively;

FIG. 15(*b*) is a photograph of a plurality of resultant images after applying the method of compression artifacts removal of FIG. 10 to a plurality of images respectively generated from IrisCode obtained from the original iris images of FIG. 15(*a*).

DETAILED DESCRIPTION OF THE PREFERRED EMBODIMENT

Figure 1:
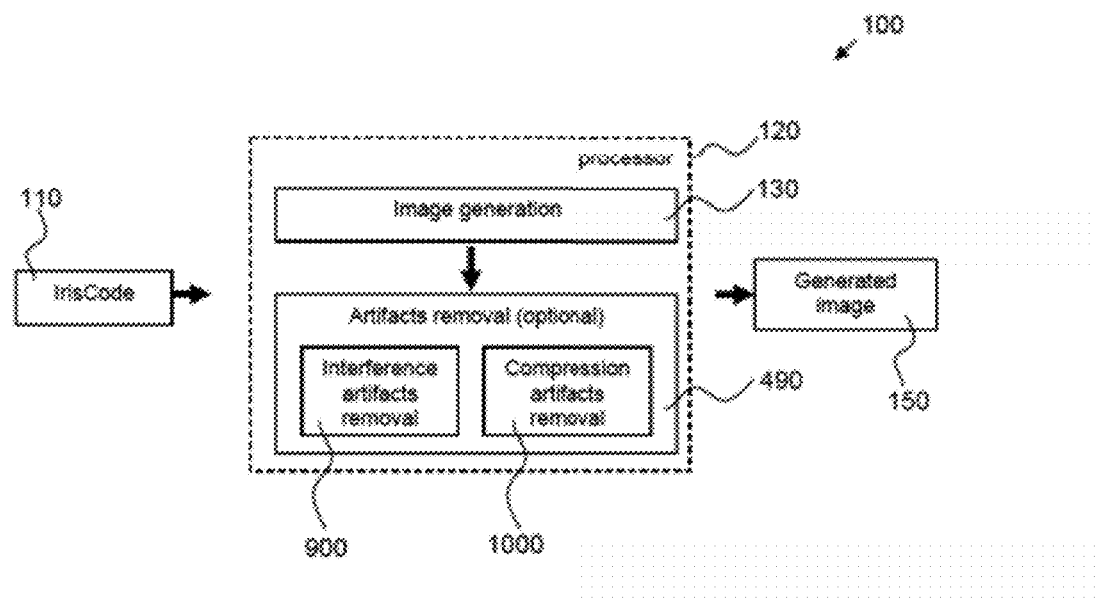
FIG. 1 is an illustration of an apparatus for image generation and artifact removal according to an example embodiment.

FIG. 1 shows an apparatus 100 for image generation according to an example embodiment. The apparatus 100 comprises a processor 120 which is configured to perform image generation 130, and then optionally perform artifacts removal 490. The apparatus 100 is provided with an IrisCode 110 either externally (for example, reading from an external storage device), or internally (for example, obtaining from internal memory or cache). The IrisCode 110 is obtained from an original image.

The image generation 130 may be performed using an image generation method that will be described later. The artifacts removal 490 may be performed using artifacts removal methods such as a method of interference artifacts removal 900 and/or a method of compression artifacts removal 1000 that will be described later. The artifacts removal is optional and may not be performed.

After performing image generation 130 and the optional artifacts removal 490, the apparatus is configured to produce a generated image 150. The generated image 150 may be stored internally within the apparatus 100, or optionally be fed out of the apparatus for storage, display, etc. The generated image 150 is considered to be a reconstruction of the original image.

The apparatus 100 may take the form of a computer system, an embedded processor, a System-on-chip (SOC) device, or even a computing system comprising multiple processors and/or computer systems e.g. a parallel computing system.

The possibility of using IrisCode 110 as a compression algorithm is discussed next. Let $g_{rj}$ and $g_{ij}$ respectively be the real and imaginary parts of a j-th zero DC Gabor filter $g_j$. $g_{rj}$ and $g_{ij}$ can be used to generate a bit pair in IrisCode. The entire IrisCode is made up of 1024 bit pairs, i.e. j. Let I denote an original image such that $I=I_0(\rho, \phi)\rho$. $I_0(\rho, \phi)$ denotes the original image in a polar coordinate system with $\rho$ as the radial coordinate and $\phi$ as the angular coordinate. $\langle g_{r(i)j}, I \rangle$ thus denotes the inner product of $g_{r(i)j}$ and I i.e. $\langle g_{r(i)j}, I \rangle = \iint g_{r(i)j} \times I dxdy$ where $g_{r(i)j}$ is a real (imaginary) part of a Gabor filter. It is noted that the inner product exhibits symmetry e.g. $\langle g_{r(i)j}, I \rangle = \langle I, g_{r(i)j} \rangle$. $I_0$ is obtainable from I as $\rho$ is not zero. $\rho$ in general may have a value between 0 and 1. If $\rho$ is allowed to be zero, the pixels in the first row of $I_0(\rho, \phi)$ are removed to compute IrisCode. Consequently the pixels in the first row of $I_0(\rho, \phi)$ may not be obtainable from $I=I_0(\rho, \phi)\rho$. Assuming that I can be decomposed as:

$$I = \sum_{j=1}^{n} a_j g_{rj} + \sum_{j=1}^{n} b_j g_{ij} + \sum_{j=1}^{m} c_j \gamma_j + d\Phi \tag{5}$$

where $a_j$, $b_j$, $c_j$, and $d \in \Re$ and $\Phi=[1\ 1\ \ldots\ 1]^T$. $a_j$ and $b_j$ denote coefficients for the respective filters $g_{rj}$ and $g_{ij}$. $\gamma_1, \ldots \gamma_{m-1}$, and $\gamma_m$ denote the basis that spans the orthogonal complement of the space spanned by the filters $g_{r1}, \ldots g_{rn}$ and $g_{i1}, \ldots g_{in}$, and the DC vector $\Phi$, while m is a constant denoting the dimension of this space. $c_j$ denotes the coefficients of these bases. $\gamma_j$ is a unit vector which is orthogonal to $\Phi$, $g_{rk}$ and $g_{ik}$ such that $\langle g_{r(i)k}, \gamma_j \rangle = 0$ and $\langle \Phi, \gamma_j \rangle = 0$, where $1 \le k \le n$. n is the number of bit pairs in the IrisCode, e.g. n=1024.

$$\sum_{j=1}^{n} a_j g_{rj} \text{ and } \sum_{j=1}^{n} b_j g_{ij}$$

thus are the real and imaginary filter components of I, $$\sum_{j=1}^{m} c_j \gamma_j$$

are the orthogonal components, while $d\Phi$ is a component representing the brightness of the image.

Using Equation 5, the inner product of $g_{r(i)k}$ and I can be obtained by $$\langle g_{r(i)k}, I \rangle = \sum_{j=1}^{n} a_j \langle g_{r(i)k}, g_{rj} \rangle + \sum_{j=1}^{n} b_j \langle g_{r(i)k}, g_{ij} \rangle + \sum_{j=1}^{m} c_j \langle g_{r(i)k}, \gamma_j \rangle + d \langle g_{r(i)k}, \Phi \rangle \tag{6}$$

$g_{r(i)k}$ is orthogonal to $\gamma_j$ and $\Phi$ for all $1 \le k \le n$ and $1 \le j \le n$. Equation 6 can be simplified as $$\langle g_{r(i)k}, I \rangle = \sum_{j=1}^{n} a_j \langle g_{r(i)k}, g_{rj} \rangle + \sum_{j=1}^{n} b_j \langle g_{r(i)k}, g_{ij} \rangle \tag{7}$$

Using a matrix representation, it can be shown that M=GA where $$M = [\langle g_{r1}, I \rangle, \ldots, \langle g_{rm}, I \rangle, \langle g_{i1}, I \rangle, \ldots, \langle g_{im}, I \rangle]^T, A = [a_1, \ldots, a_m, b_1, \ldots, b_n]^T$$

and $$G = \begin{bmatrix} \langle g_{r1}, g_{r1} \rangle & \cdots & \langle g_{r1}, g_{rm} \rangle & \langle g_{r1}, g_{i1} \rangle & \cdots & \langle g_{r1}, g_{in} \rangle \\ \vdots & \ddots & \vdots & \vdots & \ddots & \vdots \\ \langle g_{rm}, g_{r1} \rangle & \cdots & \langle g_{rm}, g_{rm} \rangle & \langle g_{rm}, g_{i1} \rangle & \cdots & \langle g_{rm}, g_{in} \rangle \\ \langle g_{i1}, g_{r1} \rangle & \cdots & \langle g_{i1}, g_{rm} \rangle & \langle g_{i1}, g_{i1} \rangle & \cdots & \langle g_{i1}, g_{in} \rangle \\ \vdots & \ddots & \vdots & \vdots & \ddots & \vdots \\ \langle g_{in}, g_{r1} \rangle & \cdots & \langle g_{in}, g_{rm} \rangle & \langle g_{in}, g_{i1} \rangle & \cdots & \langle g_{in}, g_{in} \rangle \end{bmatrix} \quad (8)$$

If G is invertible, we can substitute $A = G^{-1}M$ into Equation 5 to obtain $$I = [g_{r1} \ldots g_{rm} g_{i1} \ldots g_{in}] G^{-1} M + \sum_{j=1}^{m} c_j \gamma_j + d\Phi \quad (9)$$

Let $[\xi_{r1} \ldots \xi_{rm} \xi_{i1} \ldots \xi_{im}] = [g_{r1} \ldots g_{rm} g_{i1} \ldots g_{in}] G^{-1}$. Equation 9 can then be rewritten as $$I = \sum_{j=1}^{n} \langle g_{rj}, I \rangle \xi_{rj} + \sum_{j=1}^{n} \langle g_{ij}, I \rangle \xi_{ij} + \sum_{j=1}^{m} c_j \gamma_j + d\Phi \quad (10)$$

$\xi_{rj}$ and $\xi_{ij}$ respectively can be referred to as vectors of the real and imaginary inner products. It is noted that $\xi_{rj}$ and $\xi_{ij}$ respectively are solutions to $G\xi_{rj} = g_{rj}$ and $G\xi_{ij} = g_{ij}$.

It should be appreciated from Equation 10 that IrisCode may be considered to be a compression algorithm. This is because IrisCode uses one bit to store a quantized value for each coefficient of $\xi_{r(i)j}$ i.e. $\langle g_{r(i)j}, I \rangle$, and erases all other coefficients. The quantization of coefficients and removal of unimportant coefficients may result in a compressed information representation.

Equation 10 also indicates that if the values of $\langle g_{r(i)j}, I \rangle$ are known, an approximated iris image can be obtained, i.e.

$$I \approx \sum_{j=1}^{n} \langle g_{rj}, I \rangle \xi_{rj} + \sum_{j=1}^{n} \langle g_{ij}, I \rangle \xi_{ij} \quad (11)$$

Equation 11 may be used to decompress an IrisCode.

It can be seen that none of the properties of Gabor filters are exploited in obtaining Equation 11. Thus, the theoretical result of Equation 11 is applicable to all methods that use the core of IrisCode for personal identification. In other words, many methods of palm print and iris recognition may be considered to be compression algorithms, and their templates are compressed biometric images.

An assumption is made in Equation 9 that G is invertible. If G is non-invertible, for example for other forms of biometrics, other methods (e.g. least square method) may be used to solve the system of linear equations $M = GA$.

Figure 2:
FIGS. 2(a) and (b) are two photographs of original normalized iris images.
FIGS. 2(c) and (d) are two photographs of images generated from IrisCodes and their associated magnitude information, the IrisCodes respectively obtained from FIGS. 2(a) and (b)
Figure 2:
Figure 2:

FIGS. 2(a) and 2(b) show original normalized iris images. FIGS. 2(c) and 2(d) show images generated using Equation 11 from IrisCodes and their associated magnitude information, the IrisCodes respectively obtained from FIGS. 2(a) and 2(b). The generated images retain some key features such as iris texture and eyelids, and are thus a reconstruction of the original image. Since Equation 11 does not contain the brightness component i.e. $d\Phi$, the average intensities of the generated images are thus different. Further, some compression artifacts can be observed in the generated images.

The compression ratio of IrisCode is extremely high. Assuming that the size of a normalized iris image is 512 pixels by 64 pixels, and one byte is used to store each pixel. Therefore, the compression ratio is 128 (since a typical IrisCode is 256 bytes and $$\frac{512 \times 64 \times 1}{256} = 128 \Big).$$

However, IrisCode may be further compressed without loss of information to about 50 bytes. To put it in perspective, 50 bytes is smaller than the size of an 8 pixel by 8 pixel patch in an 8-bit image. With this further level of compression, the compression ratio is increased to 655 (since $$\frac{512 \times 64 \times 1}{50} = 655 \Big).$$

The generation of images from IrisCode, or decompression of IrisCode is thus challenging because of this high compression ratio.

Database Training

In order to model the structure of the training images of the database, as well as to model the IrisCode for image generation, graphs are defined such that for a graph where $P = (V, E)$, V is a set of nodes representing the 1024 Gabor filters and E is a set of unordered pairs of vertices or edges.

Figure 3:
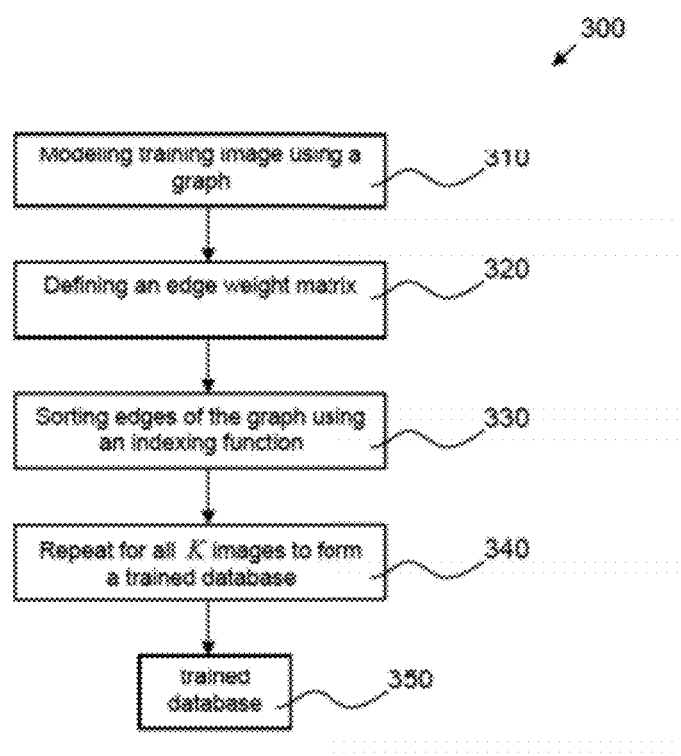
FIG. 3 is a flow chart illustrating a method of database training which is required by the apparatus of FIG. 1 for image generation.

FIG. 3 shows a method 300 for database training according to the example embodiment. In 310, a training image is modelled using a graph. Given a k-th training image of the database, the training image may be denoted as $I_k$. The j-th node of the graph stores $S_j = I_k, g_j > / X_k$, where $S_j$ is a response value denoting the response of a filter $g_j$ to the image $I_k$ during training, $g_j$ denotes the j-th filter which is optionally a Gabor filter, and $$X_k = \left\| \sum_{j=1}^{n} \langle g_{rj}, I_k \rangle \xi_{rj} + \sum_{j=1}^{n} \langle g_{ij}, I_k \rangle \xi_{ij} \right\|.$$

$X_k$ is the norm of Gabor components in the image, which controls the contrast of the image. $\|\phi\|$ denotes the computation of a norm. The corresponding j-th IrisCode bit pair $B_j$ will also be stored in the j-th node.

The edge between a j-th node and a u-th node is then weighted with the training magnitude of $\langle g_j, g_u \rangle$, which is denoted as $|\langle g_j, g_u \rangle|$. $\langle g_j, g_u \rangle$ is the inner product of the filters $g_j$ and $g_u$ which respectively are associated with the j-th node and u-th nodes and $|\phi|$ denotes a magnitude computation. The training magnitude models the impact of the j-th node on the u-th node, and vice versa. If $|\langle g_j, g_u \rangle| = 0$, the j-th node and the u-th node can be regarded as disconnected. If the training filters are Gabor filters, $g_j$ and $g_u$ would be the j-th and u-th Gabor filter in a complex analytical form and the structure of this graph is fixed for all k-th training images where $k = 1 \ldots K$, because the edges of the graphs are not dependent on $I_k$.

Figure 5:
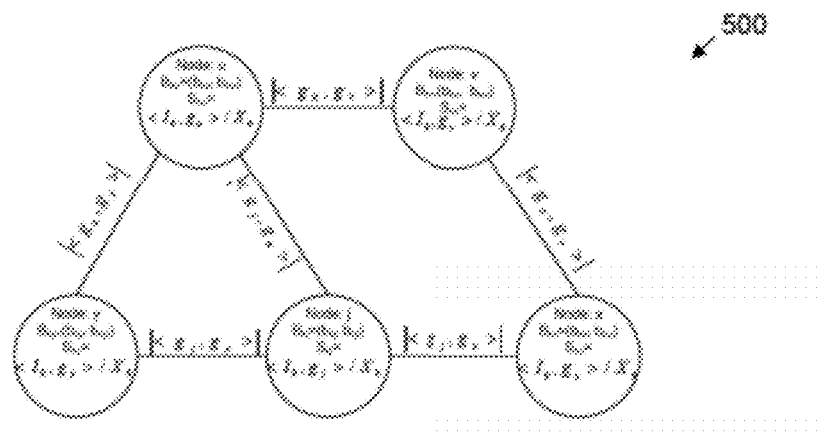
FIG. 5 is an illustration of a graph generated from a training image.

FIG. 5 shows an illustration of a graph 500 generated from a k-th training image $I_k$.

Turning back to FIG. 3, in 320, the training magnitudes of the edges of the graph are defined using an edge weight matrix $\Omega$.

$$\Omega = \begin{bmatrix} |\langle g_1 g_1 \rangle| & |\langle g_1 g_2 \rangle| & \cdots & |\langle g_1 g_{n-1} \rangle| & |\langle g_1 g_n \rangle| \\ |\langle g_2 g_1 \rangle| & |\langle g_2 g_2 \rangle| & & |\langle g_2 g_{n-1} \rangle| & |\langle g_2 g_n \rangle| \\ \vdots & & \ddots & & \vdots \\ |\langle g_{n-1} g_1 \rangle| & |\langle g_{n-1} g_2 \rangle| & & |\langle g_{n-1} g_{n-1} \rangle| & |\langle g_{n-1} g_n \rangle| \\ |\langle g_n g_1 \rangle| & |\langle g_n g_2 \rangle| & \cdots & |\langle g_n g_{n-1} \rangle| & |\langle g_n g_n \rangle| \end{bmatrix} \quad (12)$$

$\Omega$ summarizes the connections of the nodes and the weights of edges.

In 330, the edges of the graph are sorted using an indexing function. The weights of the edges $|\langle g_j, g_1 \rangle|, \ldots, |\langle g_j, g_n \rangle|$ are sorted for example in descending order i.e., $|\langle g_j, g_{R(j,1)} \rangle| \geq |\langle g_j, g_{R(j,2)} \rangle| \geq \ldots \geq |\langle g_j, g_{R(j,n)} \rangle|$, where R is the indexing function. This allows the comparison of different nodes against the j-th node of the k-th graph.

Because $g_j$ is normalized, $R(j,1)=j$. Using this indexing function, a ranked weight matrix $\Psi$ is defined as $$\Psi = \begin{bmatrix} |\langle g_1 g_{R(1,1)} \rangle| & |\langle g_1 g_{R(1,2)} \rangle| & \cdots & |\langle g_1 g_{R(1,n-1)} \rangle| & |\langle g_1 g_{R(1,n)} \rangle| \\ |\langle g_2 g_{R(2,1)} \rangle| & |\langle g_2 g_{R(2,2)} \rangle| & & |\langle g_2 g_{R(2,n-1)} \rangle| & |\langle g_2 g_{R(2,n)} \rangle| \\ \vdots & & \ddots & & \vdots \\ |\langle g_{n-1} g_{R(n-1,1)} \rangle| & |\langle g_{n-1} g_{R(n-1,2)} \rangle| & & |\langle g_{n-1} g_{R(n-1,n-1)} \rangle| & |\langle g_{n-1} g_{R(n-1,n)} \rangle| \\ |\langle g_n g_{R(n,1)} \rangle| & |\langle g_n g_{R(n,2)} \rangle| & \cdots & |\langle g_n g_{R(n,n-1)} \rangle| & |\langle g_n g_{R(n,n)} \rangle| \end{bmatrix} \quad (13)$$

In 340, the steps of modeling 310, defining the edge weight matrix 320 and sorting the edges using an indexing function 330 are repeated for all K training images to form a trained database 350. Given K training images, the trained database would have K graphs. The nodes of each of the k-th graph where k=1 . . . K store the different bit pairs $B_j$ and training response values $S_j$, for j=1 . . . n where n is the number of nodes in each graph e.g. n=1024. It is noted that all K graphs would have the same structure i.e. $\Omega$ and $\Psi$ (which is defined below) are the same for all the graphs.

Magnitude Information Recovery

Figure 4:
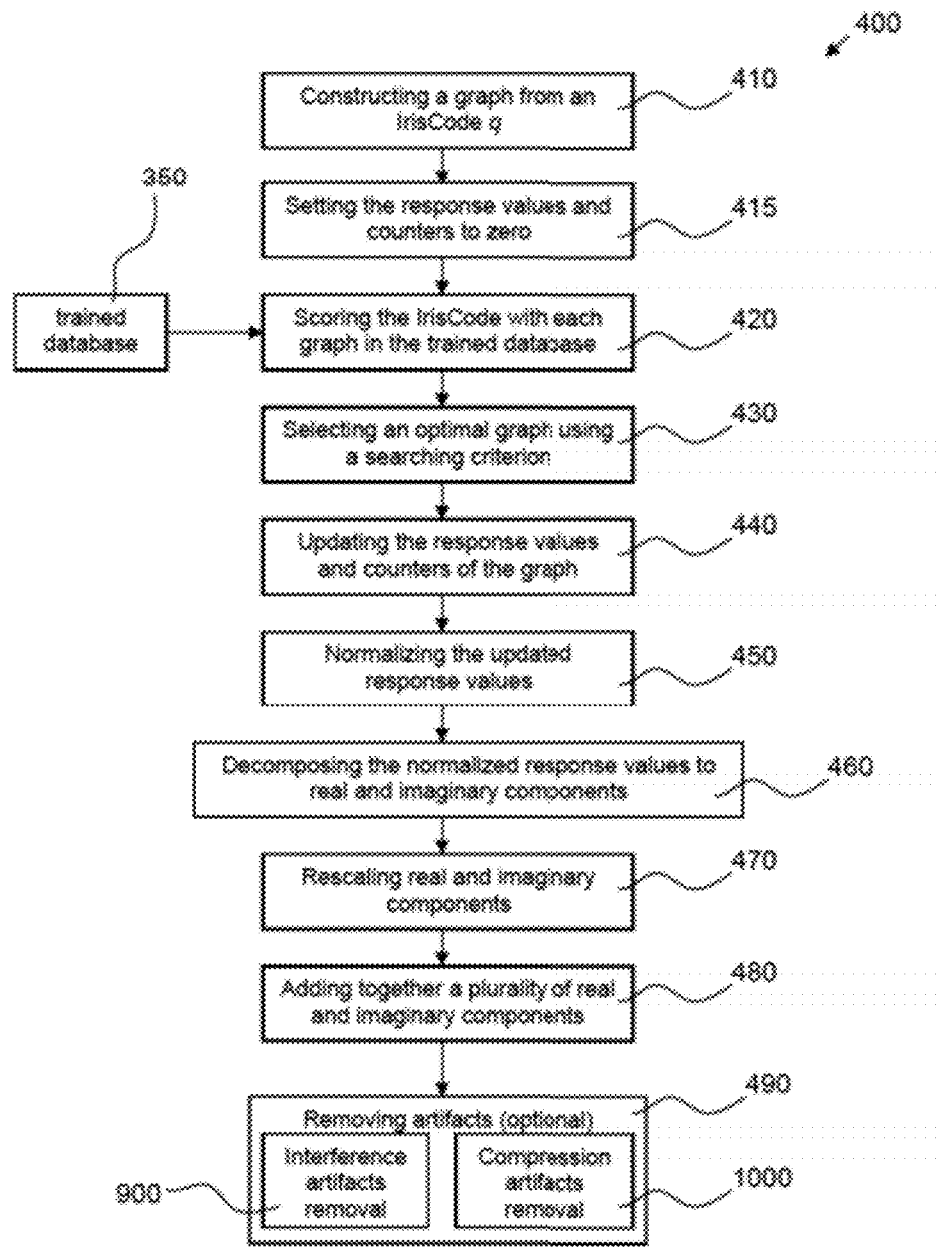
FIG. 4 is a flow chart illustrating the method for image generation which is performed by the apparatus of FIG. 1.

FIG. 4 shows a method 400 for image generation 130 performed by the processor 120 of FIG. 1. This method assumes that a trained database 350 is available. The graph constructed in the trained database 350 indicates that a node is influenced by its adjacent nodes. The method 400 uses these relationships to recover the magnitude information of the IrisCode for each j-th filter i.e. $|\langle I, g_{rj} \rangle|$ and $|\langle I, g_{ij} \rangle|$, and thus may be regarded as a decompression of the IrisCode.

In 410, a generating graph is constructed from an IrisCode denoted q that is obtained from an original image. The bit pairs $B_q$ of the IrisCode q are stored in the nodes of the graph; each node of the graph stores a bit pair $B_{qj}=(b_{qjr}, b_{qji})$. Each node of the graph also has a counter $C_{qj}$ and a response value $S_{qj}$ which models the response to a filter $g_j \cdot g_j$, which may be a Gabor filter.

The edges of the generating graph between a j-th node and a u-th node are weighted $|\langle g_j, g_u \rangle|$. $|\langle g_j, g_u \rangle|$ is the inner product of the filters $g_j$ and $g_u$, which respectively are associated with the j-th node and u-th nodes. The edges of the graph for each of j=1 . . . n are then sorted by their weights using an indexing function R such that $\langle g_j, g_1 \rangle, \ldots, \langle g_j,$
$g_u \rangle, \ldots, \langle g_j, g_n \rangle$ is reordered to be $\langle g_j, g_{R(j,1)} \rangle, \langle g_j, g_{R(j,2)} \rangle, \ldots, \langle g_j, g_{R(j,n)} \rangle$.

In 415, the response values $S=\{S_{q1}, \ldots, S_{qj}, \ldots, S_{qn}\}$ and the counters $C=\{C_{q1}, \ldots, C_{qj}, \ldots, C_{qn}\}$ for the generating graph are set to zero.

Figure 6:
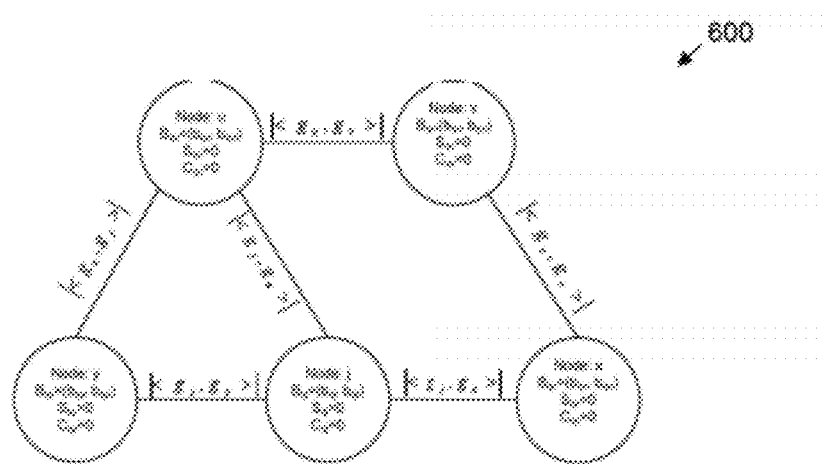
FIG. 6 is an illustration of a graph constructed from an IrisCode, the graph comprising a plurality of nodes, where the S and C values of the plurality of nodes are set to zero.

FIG. 6 shows an illustration of a graph 600 constructed from an IrisCode q where all S and C values are set to zero.

Assuming that the trained database 350 has K training images, there are K graphs in the database. The information contained in the trained database 350 is used to recover the S values of the generating graph constructed using the IrisCode q.

In 420, the IrisCode q as represented by the sorted graph is scored with each graph in the trained database 350 using a scoring function $f(B_{kR(j,t)}, B_{qR(j,t)})$. The algorithm processes node after node, for j=1 . . . n .

Given a j-th node, the bit pairs of the input IrisCode q i.e. $B_{qj}=(b_{qjr}, b_{qji})$ are scored against each graph of the database. The scoring function is $$f(B_{kR(j,t)}, B_{qR(j,t)}) = \begin{cases} 1 & \text{if } b_{kR(j,t)r} = b_{qR(j,t)r} \text{ and } b_{kR(j,t)i} = b_{qR(j,t)i} \\ -\infty & \text{otherwise} \end{cases} \quad (14)$$

$B_{kR(j,t)}$ denotes the R(j,t)-th bit pair of a k-th graph of the trained database while $B_{qR(j,t)}$ denotes the R(j,t)-th bit pair of the sorted generating graph of the IrisCode q. $b_{kR(j,t)r}$ and $b_{qR(j,t)r}$ respectively denote the real bits of $B_{kR(j,t)}$ and $B_{qR(j,t)}$, while $b_{kR(j,t)i}$ and $b_{qR(j,t)i}$ respectively denote the imaginary bits of $B_{kR(j,t)}$ and $B_{qR(j,t)}$.

In 430, an optimal graph is selected from the trained database 350 using a searching criterion. The searching criterion is $$(k_j, T_j) = \underset{k}{\operatorname{argmax}} \left( \max_T \left( \sum_{t=1}^{T} f(B_{kR(j,t)}, B_{qR(j,t)}) \right) \right) \quad (15)$$

where $k_j$ is an index number of the optimal graph in the trained database, $T_j$ is the number of nodes of the optimal graph from the trained database 350 that match $B_{qR(j,t)}$ and T is a variable between 1 and 1024.

This criterion is equivalent to searching for an optimal graph in the training database which has maximum consecutive bit pairs that match the corresponding bit pairs in the input IrisCode q.

In 440, the response values and counters of the generating graph 600 are updated using the optimal graph $k_j$ from the trained database. The following updates are performed:

$$S_{qR(j,t)} = S_{qR(j,t)} + \Psi(j,t) \times S_{k_j R(j,t)} \quad (16)$$

$$C_{qR(j,t)} = C_{qR(j,t)} + \Psi(j,t) \quad (17)$$

where $1 \leq t \leq T_j$, and × denotes a multiplication. $S_{qR(j,t)}$ is an estimated Gabor response of the image $I_q$ and the Gabor filter $g_{R(j,t)}$, $S_{k_jR(j,t)}$ is the Gabor response of the training Image $I_{k_j}$ and $g_{R(j,t)}$, $C_{qR(j,t)}$ is a counter for the node indexed to be R(j,t) in the input graph q and Ψ(j,t) is the value in the ranked weight matrix Ψ at j-th row and t-th column. In other words, Ψ(j,t) gives the weight of the edge between the j-th and t-th nodes of the optimal graph $k_j$.

Equations 14, 15 and 16 ensures that $Q(Re(S_{qR(j,t)})) = B_{qR(j,t)}$ and $Q(Im(S_{qR(j,t)})) = B_{qR(j,t)}$, where Q represents the quantization process defined by Equations 1 and 2 for real components, and Equations 3 and 4 for imaginary components.

In 450, the updated response values of the generating graph 600 are normalized. This is done when all 1024 nodes are updated in 440. All the $S = \{S_{q1}, \ldots, S_{qj}, \ldots, S_{qn}\}$ values are normalized by $$S_{qj} = S_{qj}/C_{qj} \tag{18}$$

In 460, the normalized response values are decomposed into real and imaginary components i.e. $\langle I_q, g_{rj} \rangle = Re(S_{qj})$ and $\langle I_q, g_{ij} \rangle = Im(S_{qj})$ for j=1 ... n. By decomposing the S values, $\langle I_q, g_{rj} \rangle$ and $\langle I_q, g_{ij} \rangle$ can be estimated and respectively denoted $\langle \hat{I}_q, g_{rj} \rangle$ and $\langle \hat{I}_q, g_{ij} \rangle$. Using Equation 11, an approximated $I_q$ is obtained as $\hat{I}_q$. $\hat{I}_q$ represents the approximate image generated from the IrisCode q.

In 470, the real and imaginary components $\langle \hat{I}_q, g_{rj} \rangle$ and $\langle \hat{I}_q, g_{ij} \rangle$ are rescaled for j=1 ... n where n is the number of bit pairs in the IrisCode q. This is done because the magnitude of the final $S_{qj}$ may be very different from the magnitude of $\langle I, g_j \rangle$, since the S values in the trained database are normalized by $X_k$.

Rescaling comprises the computing of the norm $X_q$ of the approximate generated image $\hat{I}_q$ as $$X_q = \left\| \sum_{j=1}^{n} \langle g_{rj}, \hat{I}_q \rangle \xi_{rj} + \sum_{j=1}^{n} \langle g_{ij}, \hat{I}_q \rangle \xi_{ij} \right\|,$$

and then rescaling $\langle \hat{I}_q, g_{rj} \rangle$ and $\langle \hat{I}_q, g_{ij} \rangle$ as $\langle \hat{I}_{qresscle}, g_{rj} \rangle = \langle \hat{I}_q, g_{rj} \rangle \alpha/X_q$ and $\langle \hat{I}_{qresscle}, g_{ij} \rangle = \langle \hat{I}_q, g_{ij} \rangle \alpha/X_q$ respectively i.e. $\alpha/X$ is the scaling value. $\hat{I}_{qresscle}$ denotes a rescaled version of the approximate generated image $\hat{I}_q$, α is a scale factor and $X_q$ is a contrast value of the real and imaginary components of $\hat{I}_q$. If α is unknown, α can simply be set as $$\alpha = \frac{1}{K} \sum_{k=1}^{K} X_k$$

i.e. α is an average contrast value of the plurality of images used in the trained database.

Information about the coefficient d which controls the brightness of I, as well as the norm of $$\sum_{j=1}^{n} \langle g_{rj}, I \rangle \xi_{rj} + \sum_{j=1}^{n} \langle g_{ij}, I \rangle \xi_{ij} + \sum_{j=1}^{m} c_j \gamma_j$$

which controls the contrast of I are completely absent. There is however no need to recover this information because iris recognition methods typically are insensitive to the brightness and contrast of I.

In 480, the real and imaginary components are added together to produce the rescaled version of the generated image $\hat{I}_{qresscle}$. In this case, the rescaled real and imaginary components i.e. $\langle \hat{I}_{qresscle}, g_{rj} \rangle$ and $\langle \hat{I}_{qresscle}, g_{ij} \rangle$ are added together using Equation 11, with $\langle \hat{I}_{qresscle}, g_{rj} \rangle$ in place of $\langle g_{rj}, I \rangle$ and $\langle \hat{I}_{qresscle}, g_{ij} \rangle$ in place of $\langle g_{ij}, I \rangle$.

It is noted that in the present embodiment of obtaining the approximate generated image $\hat{I}_q$ or the rescaled generated image $\hat{I}_{qresscle}$ from the IrisCode q, the complex Gabor filters $g_j$ for j=1 ... n are not used as illustrated by equations (10) and (11) and thus the results may be applicable to other coding methods. Consequently, the method 400 of image generation of the present embodiment may be used to generate images from other forms of biometric codes, e.g. biometric codes for palm print, hand vein patterns, finger-knuckle, retinas, or faces. These biometric codes do not have to use Gabor filters; other forms of linear filters or functions may be used in place of Gabor filters.

Although the complex Gabor filters are not necessary in generating the image, the knowledge of the complex Gabor filter however may give extra information for the reconstruction from IrisCode. For example, knowledge of the filters in Equation 14 allows the real and imaginary parts to be considered simultaneously and consequently, the phase and magnitude of the Gabor response may be used to approximate a Gabor atom in the image being reconstructed.

Further, although the present embodiment considers the bits of an IrisCode in a pairwise fashion—with a bit of the pair representing the real component and the other bit representing the imaginary component—it is envisaged that a bit may be used as the basic processing unit. In such as a case, the graph constructed in 410 may store a bit in each node of the graph. Thus, instead of using Equation 14 as the scoring function in step 420, the scoring function may be $$f(b_{kR(j,t)r(i)} = b_{qR(j,t)r(i)}) = \begin{cases} 1 & \text{if } b_{kR(j,t)r(i)} = b_{qR(j,t)r(i)} \\ -\infty & \text{otherwise} \end{cases}$$

The searching criterion used in 430 may then be $$(k_j, T_j) = \arg\max_k \left( \max_T \left( \sum_{t=1}^{T} f(b_{kR(j,t)r(i)}, b_{qR(j,t)r(i)}) \right) \right)$$

Figure 7A:
FIGS. 7(a) and (b) are two photographs of original iris images.
Figure 7B:
FIGS. 7(c) and (d) are two photographs of images generated using the method of FIG. 4 from IrisCodes respectively obtained from FIGS. 7(a) and (b)
Figure 7C:
Figure 7D:

FIGS. 7(a) and 7(b) show two original iris images. FIGS. 7(c) and 7(d) show two images generated using the method of FIG. 4 from IrisCodes obtained from the respective two original iris images in FIGS. 7(a) and 7(b). In other words, FIGS. 7(c) and 7(d) are reconstructed images of FIGS. 7(a) and 7(b). The FIGS. 7(c) and 7(d) are displayed using the DC and contrast of the original images in order to avoid human perception differences. It can be seen that that many detailed features (e.g. eyelid and iris texture) are successfully recovered. However, many artifacts can also be observed. Some of these artifacts result from the updating 440 of the response values and counters of the graph 600, while some of these artifacts are due to the missing orthogonal components $\gamma_j$.

In 490, the artifacts are removed from the generated image. Two post-processing techniques are used. The first post-processing technique removes interference artifacts while the second post-processing technique removes artifacts resulting due to the missing $\gamma_j$. Both of these techniques operate in the Fourier domain because these artifacts have a very strong periodic behavior.

It is noted once again that the complex Gabor filters $g_j$ for j=1 ... n are not used in either of the post-processing techniques and thus the post-processing techniques may be applicable to other coding methods or forms of biometrics. In other words, the artifacts removal techniques may be applied to other types of images or biometrics, not only the images generated from IrisCode.

For simplicity however, the artifacts removal techniques are described using an image generated from IrisCode which will be denoted using the notation $\hat{I}$. The resultant images from each of the artifacts removal techniques is then denoted as $\tilde{I}$.

The two artifact removal techniques, namely the interference artifact removal 900 and the compression artifact removal 1000 will now be described.

Interference Artifact Removal 900

Figure 8A:
FIG. 8(a) is a photograph of an original iris image.
Figure 8B:
FIG. 8(b) is a photograph of an image generated from IrisCode obtained from the original iris image of FIG. 8(a)
Figure 8C:
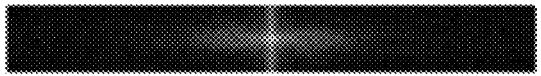
FIGS. 8(c) and 8(d) are two photographs of log power spectrum images of FIGS. 8(a) and 8(b) respectively.
Figure 8D:

FIG. 8(a) shows an original iris image and FIG. 8(b) shows an image generated from the IrisCode obtained from the original iris image. FIGS. 8(c) and 8(d) respectively then show the log power spectrums of FIGS. 8(a) and 8(b).

It can be seen from FIG. 8(d) that the generated image $\hat{I}$ contains more energy in the high frequency spectrum than FIG. 8(c) and that $\hat{I}$ has sixteen frequency bands with very high energy as represented by the lighter/white shades in the spectral diagram of FIG. 8(d).

Figure 9:
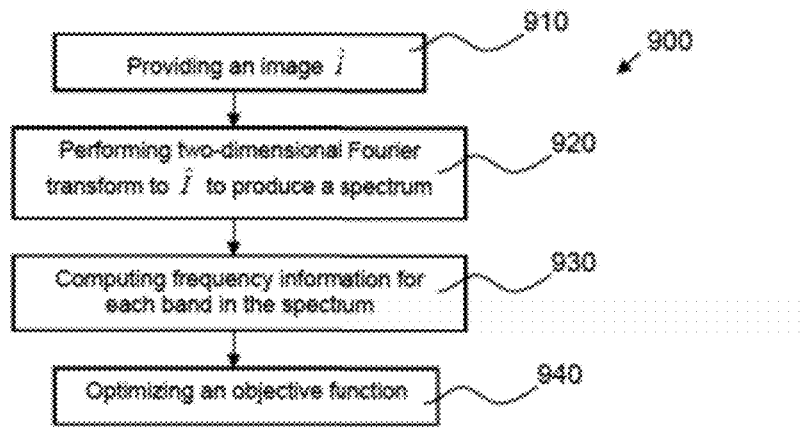
FIG. 9 is a flow chart illustrating a method for interference artifacts removal which may be the artifact removal method performed by the apparatus of FIG. 1.

FIG. 9 shows a method for interference artifacts removal 900 which may be performed by the apparatus of FIG. 1.

In 910, an image $\hat{I}$ is provided. This image may be generated using the method of image generation 400 of FIG. 4. Let $$\hat{I} = \sum_{j=1}^{n} \langle g_{rj}, \hat{I} \rangle \xi_{rj} + \sum_{j=1}^{n} \langle g_{ij}, \hat{I} \rangle \xi_{ij}$$

where $\langle g_{rj}, \hat{I} \rangle$ and $\langle g_{ij}, \hat{I} \rangle$ respectively are real and imaginary filter components, and n is the number of real and imaginary filter components. n in this case can for example be 1024.

In 920, a two-dimensional Fourier transform is applied to the image producing a spectrum of $\hat{I}$. Let $F_{2D}(\bullet)$ denote a two-dimensional Fourier transform operation. Because $F_{2D}(\bullet)$ is a linear operator, $F_{2D}(\bullet)$ when applied to $\hat{I}$ results in $$F_{2D}(\hat{I}) = \sum_{j=1}^{n} \langle g_{rj}, \hat{I} \rangle F_{2D}(\xi_{rj}) + \sum_{j=1}^{n} \langle g_{ij}, \hat{I} \rangle F_{2D}(\xi_{ij}).$$

$F_{2D}(\hat{I})$ is the spectrum of $\hat{I}$ and can be considered as a vector although $F_{2D}(\bullet)$ is a two dimensional transform.

Using a matrix representation, it can be arranged such that $$F_{2D}(\hat{I}) = Z\hat{M} \quad (19)$$

where $Z = [F_{2D}(\xi_{r1}) \ldots F_{2D}(\xi_{rn}) F_{2D}(\xi_{i1}) \ldots F_{2D}(\xi_{in})]$ and $\hat{M} = [\langle g_{r1}, \hat{I} \rangle, \ldots, \langle g_{rn}, \hat{I} \rangle, \langle g_{i1}, \hat{I} \rangle, \ldots \langle g_{in}, \hat{I} \rangle]^T$.

Therefore, the energy of $\hat{I}$ is given by $$F_{2D}(\hat{I})^H F_{2D}(\hat{I}) = \hat{M}^H Z^H Z \hat{M} \quad (20)$$

where $\bullet^H$ represents a complex conjugate transpose. It is noted from Equation 20 that the energy of $\hat{I}$ i.e. $F_{2D}(\hat{I})^H F_{2D}(\hat{I})$ may be obtained from $\hat{M}$.

$\hat{M}$ may be regarded as an independent variable vector in the minimization of the energy of $\hat{I}$. However, directly performing a minimization on Equation 20 may not be effective because this would mix together energy from different frequencies.

Figure 11:
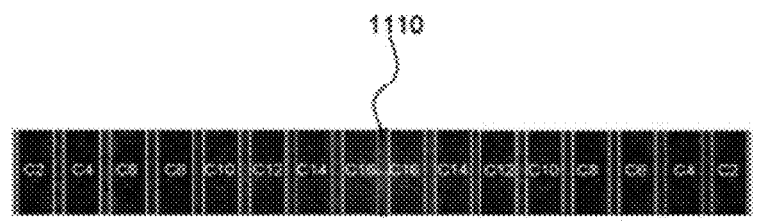
FIG. 11 is an illustration of the division of frequencies of a log power spectrum image into 16 bands.

FIG. 11 shows the division of the frequencies of a log power spectrum image into 16 bands. Only the even bands in FIG. 11 are labeled. The frequency 1110 between the two C16 bands is not considered because this band contains very low frequency information (e.g. DC) and thus should not be artifacts.

Returning to FIG. 9, in 930, the frequency information for each band in the spectrum of $\hat{I}$ is computed. The frequency information in each band is computed by $$\Gamma_e(F_{2D}(\hat{I})) = [\Gamma_e(F_{2D}(\xi_{r1})) \ldots \Gamma_e(F_{2D}(\xi_{in}))]\hat{M} \quad (21)$$

where $\Gamma_e$ is an operator that selects the elements of an input vector in band e.

Let $\Gamma_e(Z) = [\Gamma_e(F_{2D}(\xi_{r1})) \ldots \Gamma_e(F_{2D}(\xi_{in}))]$. The total energy in band e is thus $$\Gamma_e(F_{2D}(\hat{I}))^H \Gamma_e(F_{2D}(\hat{I})) = \hat{M}^H \Gamma_e(Z)^H \Gamma_e(Z)\hat{M} \quad (22)$$

In 940, an objective function is optimized. Typically, the low frequency components would have more energy but the high frequency artifacts are more visually annoying. Thus, logarithm and weighting functions are introduced to form the objective function, which is defined as $$\mu(\hat{M}) = \sum_{c=1}^{16} w(c) \log(\hat{M}^H \Gamma_e(Z)^H \Gamma_e(Z)\hat{M}) \quad (23)$$

where w is a positive weighting function that emphasizes on minimizing energy in high frequency bands.

It would be appreciated that $\hat{M} = [0 \ldots 0]^T$ is the global optimal but that is not the target solution. A local optimal is sought that is close to the input $\hat{M}$. This is done with the objective of retaining the estimated structural information but removal of the interference artifacts.

The function $\mu$ is differentiable and thus many methods known to the skilled person may be used for this optimization. In this embodiment, the gradient descent method is used. In doing so, $\hat{M}$ is iteratively updated with the objective of minimizing the objective function. When the objective function is minimized, $\hat{M}$ will be at a local minima. This local minima value of $\hat{M}$ is denoted by $\tilde{M}$ such that $\tilde{M} = [\langle g_{r1}, \tilde{I} \rangle, \ldots, \langle g_{rm}, \tilde{I} \rangle, \langle g_{i1}, \tilde{I} \rangle, \ldots, \langle g_{in}, \tilde{I} \rangle]^T$. The resultant image $\tilde{I}$ can then be obtained by substituting the elements of $\tilde{M}$ into Equation 11.

In order to check that the input IrisCode and the IrisCode generated from the resultant image of this post-processing algorithm are similar, updates to $\hat{M}$ in each iteration of the gradient descend algorithm are checked to ensure that sign$(\hat{M}_t)$=sign$(\hat{M}_{t-1})$, where t is an iteration index. sign(A) is a sign operator retaining the sign of A. If sign$(\hat{M}_t)$=sign$(\hat{M}_{t-1})$ for each t-th iteration, then sign$(\tilde{M})$=sign$(\hat{M})$ may be achieved. $\tilde{M}$ denotes the final $\hat{M}$ resulting after gradient descent.

Figure 12A:
FIGS. 12(*a*) and (*b*) are two photographs of original iris images.
Figure 12B:
Figure 12C:
Figure 12D:
Figure 12E:
Figure 12F:

FIGS. 12(a) and (b) show two original iris images. FIGS. 12(c) and (d) show two images respectively generated using the method of image generation 400 from IrisCodes obtained from the respective two original iris images FIGS. 12(a) and (b) i.e. FIGS. 12(c) and (d) are reconstructions of FIGS. 12(a) and (b). FIGS. 12(e) and (f) then show the images FIGS. 12(c) and (d) after applying the method of interference artifacts removal 900 according to the present embodiment.

Comparing FIGS. 12(e) and (f) with the respective FIGS. 12(c) and (d), it can be seen that FIGS. 12(e) and (f) are smoother and more visually appealing. However, many compression artifacts still exist because of the missing of γ.

Compression Artifacts Removal 1000

Compression artifacts removal 1000 generates $\gamma = \{\gamma_1, \gamma_2, \ldots, \gamma_m\}$ and the coefficients $\{c_1, c_2, \ldots, c_m\}$. This allows the generation of images using Equation 10. It is noted that $\gamma_1, \ldots, \gamma_{m-1}$ and $\gamma_m$ are orthogonal to $\Phi$, $g_{rk}$ and $g_{ik}$ i.e. $\langle \Phi,$ $\gamma_j> = 0$, $<g_{rk}, \gamma_j> = 0$ and $<g_{ik}, \gamma_j> = 0$, where $1 \le k \le n$ and $1 \le j \le m$. To fulfill this requirement, principal component analysis is used to derive $\{\gamma_1, \gamma_2, \ldots, \gamma_m\}$.

Figure 10:
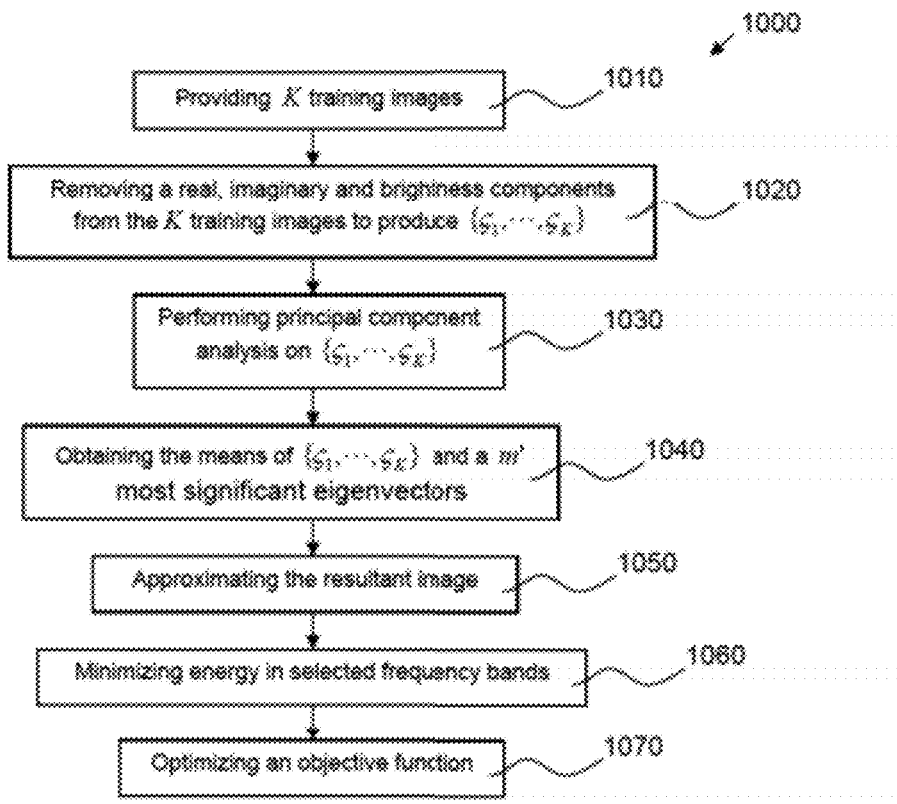
FIG. 10 is a flow chart illustrating the method for compression artifacts removal which may be the alternative artifact removal method performed by the apparatus of FIG. 1.

FIG. 10 shows the method for compression artifacts removal 1000 which is an alternative artifact removal which may be performed by the apparatus 100 of FIG. 1.

In 1010, K training images $I_k$ for $k=1 \ldots K$ are provided.

In 1020, the real (i.e.

$$\sum_{j=1}^{n} \langle g_{rj}, I_k \rangle \xi_{rj}),$$

imaginary (i.e.

$$\sum_{j=1}^{n} \langle g_{ij}, I_k \rangle \xi_{ij})$$

and brightness (i.e. $d\Phi$) components are removed from each $I_k$. In other words, all information in the space spanned by $\{g_{r1}, \ldots, g_{rn}, g_{i1}, \ldots g_{in}, \Phi\}$ are removed, i.e., $$\zeta_k = I_k - \sum_{j=1}^{n} \langle g_{rj}, I_k \rangle \xi_{rj} - \sum_{j=1}^{n} \langle g_{ij}, I_k \rangle \xi_{ij} - d\Phi \tag{24}$$

This is performed for $k=1 \ldots K$, thus producing the residual components $\{\zeta_1, \ldots, \zeta_K\}$.

In 1030, principal component analysis (PCA) is performed on $\{\zeta_1, \ldots, \zeta_K\}$. The variances of $\{\zeta_1, \ldots, \zeta_K\}$ along the directions of $g_{r1}, \ldots, g_{rn}, g_{i1}, \ldots g_{in}$ and $\Phi$ are zero and therefore the principal components computed from $\{\zeta_1, \ldots, \zeta_K\}$ are automatically orthogonal to $g_{r1}, \ldots, g_{rn}, g_{i1}, \ldots g_{in}$, and $\Phi$.

The space spanned by the principal components computed from $\{\zeta_1, \ldots, \zeta_K\}$ is in fact in the intersection between the space spanned by iris images and the orthogonal complement of the space spanned by $\{g_{r1}, \ldots, g_{rn}, g_{i1}, \ldots g_{in}, \Phi\}$. The computation of PCA may be performed using any of the techniques that is known in the art. Alternatively, other methods of sub-space analysis known to the skilled person can be performed in place of PCA, for example Factor Analysis (FA) or Independent Component Analysis (ICA).

In 1040, the means of $\{\zeta_1, \ldots, \zeta_K\}$ and the m' most significant eigenvectors are obtained. In the case where subspace methods other than PCA are used, the m' most significant sub-space components are obtained. Let $\gamma_0$ denote the mean of $\{\zeta_1, \ldots, \zeta_K\}$ and $\gamma_1, \gamma_2, \ldots$ and $\gamma_m$ are the m' most significant eigenvectors from the PCA. Thus $$\zeta_e \approx \sum_{j=1}^{m'} c'_{ej} \gamma_j + \gamma_0,$$

where $c'_{ej}$ s are coefficients and $m' < m$. e is an index with a value between 1 and K.

Figure 13A:
FIG. 13(*a*) is a photograph of an image of the mean of $\{\zeta_1, \ldots, \zeta_K\}$ calculated from a plurality of K training images in the method of FIG. 10.
Figure 13B:
Figure 13C:
Figure 13D:
Figure 13E:
Figure 13F:
Figure 13G:
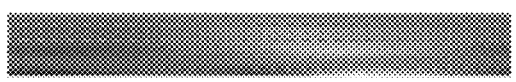
Figure 13H:

FIG. 13(a) shows the mean of $\{\zeta_1, \ldots, \zeta_K\}$ that is calculated from K training images. FIGS. 13(c), (e) and (g) show the top three principal components estimated from K=1000 images. FIGS. 13(b), (d), (f) and (h) show the log power spectrums of FIGS. 13(a), (c), (e) and (g) respectively. It can be seen that the principal components store important information to remove the compression artifacts.

Returning to FIG. 10, in 1050, the resultant image $\tilde{I}$ is approximated to be I. Using $\gamma_0, \gamma_1, \gamma_2, \ldots, \gamma_m$ and $\tilde{M}$, an iris image can be approximated as $$I \approx [\xi_{r1} \ldots \xi_{rm} \xi_{i1} \ldots \xi_{in}]\tilde{M} + \sum_{j=1}^{m'} c_j \gamma_j + \gamma_0 + d\Phi \tag{25}$$

It is noted that the method of compression artifacts removal 1000 can be done independently of the method of interference Artifact Removal 900, in which case $\hat{M}$ can be used in place of $\tilde{M}$ in Equation 25, where $$\hat{M} = [<g_{r1}, \hat{I}_q>, \ldots, <g_{rn}, \hat{I}_q>, <g_{i1}, \hat{I}_q>, \ldots, <g_{in}, \hat{I}_q>]^T$$

or $$\hat{M} = [<g_{r1}, \hat{I}_q>, \ldots, <g_{rn}, \hat{I}_{qresscle}>, <g_{i1}, \hat{I}_{qresscle}>, \ldots, <g_{in}, \hat{I}_{qresscle}>]^T.$$

Let $\tilde{I} = [\xi_{r1} \ldots \xi_{rm} \xi_{i1} \ldots \xi_{in}]\tilde{M} + \gamma_0$, $\Im = [\gamma_1, \gamma_2, \ldots, \gamma_m]$ and $C = [c_1, c_2, \ldots, C_{m'}]^T$. d can be temporarily set to $d=0$ and Equation 25 can thus be rewritten as $I \approx \tilde{I} + \Im C$.

In 1060, the energy in selected frequency bands is minimized. The energy of the compression artifacts concentrates in the frequency bands $2e-1$, where $e=1, \ldots, 8$. Thus, the energy in only these bands may be minimized by modifying the coefficient vector $C = [c_1, c_2, \ldots, c_m]^T$. C is thus a vector of weights associated with the frequency bands selected for energy minimization.

The energy of $\tilde{I} + \Im C$ may be represented as $$F_{2D}(\tilde{I}+\Im C)^H F_{2D}(\tilde{I}+\Im C) = (C^H \aleph^H + F_{2D}(\tilde{I})^H)(\aleph C + F_{2D}(\tilde{I})) \tag{26}$$

where $\aleph = [F_{2D}(\gamma_1) \ldots F_{2D}(\gamma_m)]$.

The energy in band e is thus $$\Gamma_e(F_{2D}(\tilde{I}+\Im C))^H \Gamma_e(F_{2D}(\tilde{I}+\Im C)) = (C^H \Gamma_e(\aleph)^H + \Gamma_e(F_{2D}(\tilde{I}))^H)(\Gamma_e(\aleph)C + \Gamma_e(F_{2D}(\tilde{I}))) \tag{27}$$

where the selection operator $\Gamma_e(\aleph) = [\Gamma_e(F_{2D}(\gamma_1)) \ldots \Gamma_e(F_{2D}(\gamma_m))]$.

In 1070, an objective function containing the coefficient vector $C = [c_1, c_2, \ldots, c_m]^T$ is optimized. The objective function is defined as:

$$\mu_1(C) = \sum_{e=1}^{8} \log\left(C^H \Gamma_{2e-1}(\aleph)^H + \Gamma_{2e-1}(F_{2D}(\tilde{I}))^H\right) \\ \Gamma\left(\Gamma_{2e-1}(\aleph)C + \Gamma_{2e-1}(F_{2D}(\tilde{I}))\right) \tag{28}$$

Equation 28 may thus be used to minimize the compression artifacts. The objective function of Equation 28 may be optimized using any of the methods known to the skilled person, e.g. optimization by gradient descent. Unlike the objective function of Equation 23 for the method of interference artifacts removal 900, a weighting function $w(\bullet)$ does not have to be included in Equation 28. This is because the compression artifacts in different frequency bands are considered to be equally important. As with the objective function of Equation 23, the objective function of Equation 28 is also differentiable, but the target solution in Equation 28 is a near global optimal.

Figure 14A:
FIGS. 14(*a*) and (*b*) are two photographs of original iris images.
Figure 14B:
Figure 14C:
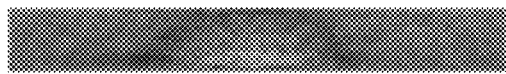
Figure 14D:
Figure 14E:
Figure 14F:

FIGS. 14(a) and 14(b) show two original iris images. FIGS. 14(c) and 14(d) show two images generated from the respective IrisCodes with the method of interference artifacts removal 900 applied. FIGS. 14(e) and 14(f) then show the images FIGS. 14(c) and 14(d) after applying the method of compression artifacts removal 1000 according to the present embodiment. FIGS. 14(e) and 14(f) may be seen as reconstructions of FIGS. 14(a) and 14(b).

It may be seen that the method of compression artifacts removal 1000 weakens the compression artifacts. Further results are shown in FIGS. 15(a) and 15(b).

Figure 15A:
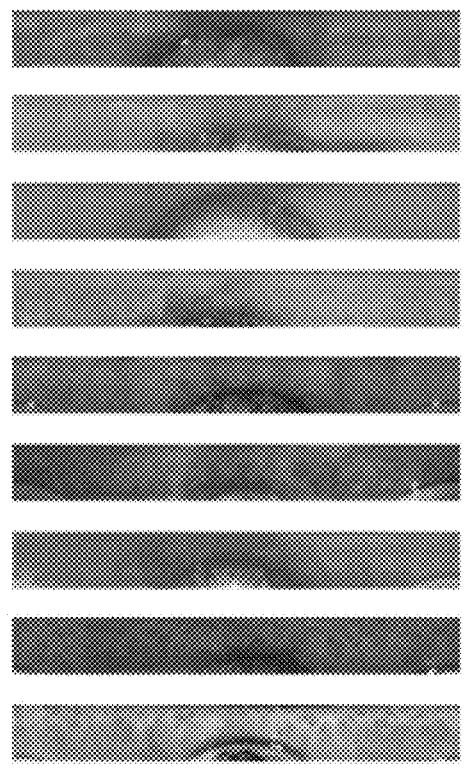
FIG. 15(*a*) is a photograph of a plurality of original iris images.
Figure 15B:
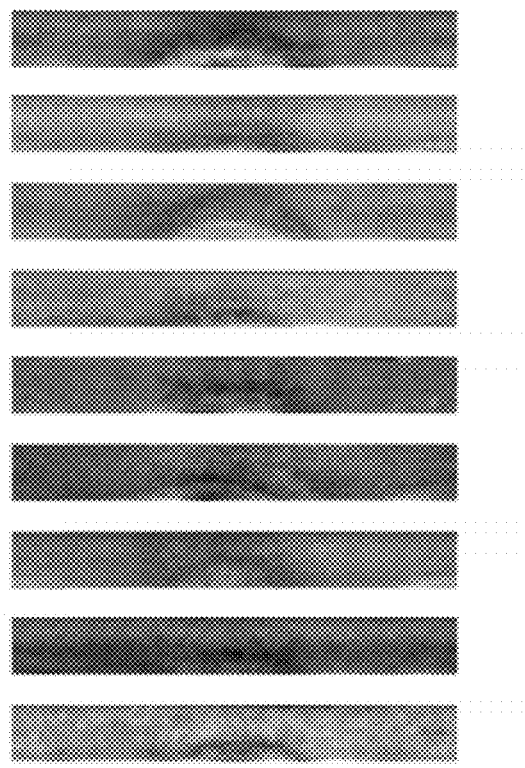

FIG. 15(a) shows a plurality of original iris images while FIG. 15(b) shows a respective plurality of resultant images after applying the method of compression artifacts removal 1000 to images generated from IrisCode obtained from the plurality of original iris images of FIG. 15(a).

As it may be appreciated, the generated images are of reasonably good quality and thus may be used to test and challenge the privacy and security of various biometric systems e.g. iris recognition systems. In addition, it is possible to allow visualization of IrisCode features since the IrisCode may now be represented by a reconstructed image, rather than simply a series of ones and zeros. The use of prior knowledge from a trained biometric database may also allow the generation or reconstruction of images from highly compressed or lossy features.

The described embodiments should not be construed as limitative. For example, while IrisCode is originally conceived to be used as a feature for iris images and iris recognition, the described embodiment may use IrisCode that is obtained from other types of images, e.g. images of palm prints, hand vein patterns, finger-knuckle, retinas, or faces. It should be appreciated that IrisCode is generally means any biometric template which is generated by the core of IrisCode.

Further, it is envisaged that other types of biometric templates or features can be used in place of IrisCode, e.g. PalmCode for palm prints, and Ordinal Code for iris images.

It is also envisaged that biometric features that are made discrete by BioHashing may be used in place of IrisCode. BioHashing is disclosed in A. T. B. Jin, D. N. C. Ling and A. Goh, "*Biohashing: two factor authentication featuring fingerprint data and tokenized random number*", Pattern Recognition, vol. 37, pp. 2245-2255, 2004, the contents of which are incorporated herein by reference.

Thus, while embodiments of the present invention are described using IrisCode, these embodiments are not limited for use with IrisCode, so long the feature used belongs to the group of algorithms sharing the same computational architecture as IrisCode.

Further, the biometric template or feature may not be derived or need not represent an original image. For example, the biometric template may be simply biometric data which is synthetically generated and the algorithm of the present invention being used to generate an image based on the biometric data. The biometric data may not be necessarily associated with a human.

While example embodiments of the invention have been described in detail, many variations are possible within the scope of the invention as will be clear to a skilled reader.

The invention claimed is:

1. A method of generating an image from biometric data, the method comprising
constructing a graph of filter responses and bits which define the biometric data;
calculating a plurality of real components and a plurality of imaginary components from the biometric data based on the graph;
comparing the bits with corresponding bits of reference graphs of a biometric database to obtain an optimal graph;
updating the filter responses based on the optimal graph; and
decompressing the biometric data based on the updated filter responses to generate an image; wherein
the method further comprises adding the calculated plurality of real and imaginary components to produce the generated image.

2. The method according to claim 1, wherein the graph comprises a plurality of nodes and a plurality of edges, wherein
each of the plurality of nodes comprises a response value for modelling respective ones of the filter responses, and
each of the plurality of edges comprises a magnitude of an inner product of two filters associated with the ends of each edge.

3. The method according to claim 2, wherein each node further includes a counter.

4. The method according to claim 3, further comprising updating the graph which includes:
setting each response value and counter to zero;
searching the biometric database based on the bits to determine the optimal graph; and
updating the response values and the counters based on the optimal graph.

5. The method according to claim 1, wherein the reference graphs are trained with a respective plurality of training images, each of the plurality of trained graphs comprising a plurality of trained nodes and a plurality of trained edges, wherein
each of the plurality of trained nodes comprises a bit pair and a training response value modelling a training filter response of the training image, and
each of the plurality of trained edges comprises a training magnitude of an inner product of two training filters associated with ends of each trained edge.

6. The method according to claim 5, wherein the each of the plurality of trained edges is sorted.

7. The method according to claim 5, wherein obtaining the optimal graph includes searching the biometric database which comprises:
scoring the biometric data with bit pairs of each of the plurality of reference graphs using a scoring function to produce a respective plurality of scores, and
selecting the optimal graph by applying a searching criterion on the plurality of scores.

8. The method according to claim 7, wherein the each of the plurality of edges of the graph is sorted.

9. The method according to claim 7, wherein the scoring function is:

$$f(B_{kR(j,t)}, B_{qR(j,t)}) = \begin{cases} 1 & \text{if } b_{kR(j,t)r} = b_{qR(j,t)r} \text{ and } b_{kR(j,t)i} = b_{qR(j,t)i} \\ -\infty & \text{otherwise} \end{cases}$$

where $f(B_{kR(j,t)}, B_{qR(j,t)})$ denotes the scoring function taking as input parameters $B_{kR(j,t)}$ and $B_{qR(j,t)}$;
where $B_{kR(j,t)}$ denotes the bit pair from a R(j,t)-th node of a k-th trained graph of the database, $B_{kR(j,t)}$ comprised of real and imaginary bits respectively denoted $b_{kR(j,t)r}$ and $b_{kR(j,t)i}$;
where $B_{qR(j,t)}$ denotes a R(j,t)-th bit pair from the IrisCode that is denoted q, $B_{qR(j,t)}$ comprised of real and imaginary bits respectively denoted $b_{qR(j,t)r}$ and $b_{qR(j,t)i}$; and where R(j,t) is an indexing function for sorting a plurality of edges between a plurality of j-th nodes and a plurality of t-th nodes, the indexing function used for sorting the plurality of trained edges and the plurality of edges of the generating graph.

10. The method according to claim 7, wherein the searching criterion is:

$$(k_j, T_j) = \underset{k}{\operatorname{argmax}} \left( \underset{T}{\max} \left( \sum_{t=1}^{T} f(B_{kR(j,t)}, B_{qR(j,t)}) \right) \right)$$

where $k_j$ is an index number of a graph of the plurality of optimal graph;

$T_j$ is the number of nodes of the $k_j$-th optimal graph with bit pairs matching the $B_{qR(j,t)}$ for the plurality of j-th nodes; and T is a variable between 1 and 1024.

11. The method according to claim 4, wherein updating the response values and the counters comprises:

$$S_{qR(j,t)} = S_{qR(j,t)} + \Psi(j,t) \times S_{k_jR(j,t)}$$

$$C_{qR(j,t)} = C_{qR(j,t)} + \Psi(j,t)$$

where $S_{qR(j,t)}$ is the response value of the R(j,t)-th node from the biometric data denoted q, $S_{k_jR(j,t)}$ is the response value of the R(j,t)-th node of the $k_j$-th optimal graph, $C_{qR(j,t)}$ is the counter of the R(j,t)-th node from the IrisCode denoted q, and $\Psi(j,t)$ is the weight of the edge between a j-th node and a t-th node of the $k_j$-th optimal graph.

12. The method according to claim 11, wherein calculating the plurality of real and imaginary components further comprises:

normalizing the updated response values of the plurality of nodes with the updated counter values of the plurality of nodes;

decomposing the normalized updated response values into the plurality of real components and the plurality of imaginary components; and rescaling the plurality of real and imaginary components by a scaling value.

13. The method according to claim 12, wherein normalizing the updated response values of the plurality of nodes comprises dividing the updated response values by the updated counter values.

14. The method according to claim 13 wherein the scaling value is:

$$\alpha/X_q$$

where $\alpha$ is a scale factor; and $X_q$ is a contrast value of the plurality of real and imaginary components.

15. The method according to claim 14, wherein $$\alpha = \frac{1}{K} \sum_{k=1}^{K} X_k$$

where $X_k$ is a contrast value of a k-th image of the plurality of training images; and K is the number of images in the plurality of training images.

16. The method according to claim 15, wherein $$X_q = \left\| \sum_{j=1}^{n} \langle g_{rj}, \hat{I}_q \rangle \xi_{rj} + \sum_{j=1}^{n} \langle g_{ij}, \hat{I}_q \rangle \xi_{ij} \right\|$$

where $\hat{I}_q$ is an approximate of the generated image;

$g_{rj}$ and $g_{ij}$ respectively are a j-th real filter and a j-th imaginary filter;

$\langle g_{rj}, \hat{I}_q \rangle$ is an inner product between $g_{rj}$ and $\hat{I}_q$;

$\langle g_{ij}, \hat{I}_q \rangle$ is an inner product between $g_{ij}$ and $\hat{I}_q$;

$\xi_{rj}$ and $\xi_{ij}$ respectively are vectors associating with the inner products $\langle g_{rj}, \hat{I}_q \rangle$ and $\langle g_{ij}, \hat{I}_q \rangle$; and n is the number of the plurality of nodes.

17. The method according to claim 5, wherein the training filter response of each of the plurality of trained nodes is a Gabor filter response.

18. The method according to claim 1, wherein the filter response of each of the plurality of nodes is a Gabor filter response.

19. The method according to claim 1, wherein generating the image further comprises removing artifacts from the generated image.

20. The method according to claim 1, wherein the biometric data is a feature for iris recognition.

21. The method according to claim 20, wherein the feature for iris recognition is IrisCode.

22. The method according to claim 1, wherein the generated image is a reconstruction of an original image, the biometric data being derived from the original image.

23. An apparatus for generating an image from biometric data, the apparatus comprising a processor configured to:

construct a graph of filter responses and bits which define the biometric data;

calculate a plurality of real components and a plurality of imaginary components from the biometric data based on the graph;

compare the bits with corresponding bits of reference graphs of a biometric database to obtain an optimal graph;

update the filter responses based on the optimal graph; and decompress the biometric data based on the updated filter responses to generate an image;

wherein the processor is further configured to add the calculated plurality of real and imaginary components to produce the generated image.

* * * * *

UNITED STATES PATENT AND TRADEMARK OFFICE
CERTIFICATE OF CORRECTION

| | |
|---|---|
| PATENT NO. | : 8,705,809 B2 |
| APPLICATION NO. | : 12/894990 |
| DATED | : April 22, 2014 |
| INVENTOR(S) | : Wai Kin Adams Kong et al. |

It is certified that error appears in the above-identified patent and that said Letters Patent is hereby corrected as shown below:

On the Title Page:

Item [73]    Assignee should read:    King Saud University, Riyadh (SA); King Abdulaziz City for Science and Technology, Riyadh (SA)

Signed and Sealed this
Twenty-fourth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,705,809 B2
APPLICATION NO. : 12/894990
DATED : April 22, 2014
INVENTOR(S) : Wai Kin Adams Kong et al.

Page 1 of 1

It is certified that error appears in the above-identified patent and that said Letters Patent is hereby corrected as shown below:

In the Claims

Column 21, line 11, "argmax" should read --arg max--.

Column 22, line 8, "where $X_k$," should read --where $X_k$--.

Column 22, line 29, "claim 1" should read --claim 2--.

Signed and Sealed this
Twenty-fourth Day of March, 2015

Michelle K. Lee
*Director of the United States Patent and Trademark Office*